(12) United States Patent
Reiner et al.

(10) Patent No.: US 9,779,177 B1
(45) Date of Patent: Oct. 3, 2017

(54) SERVICE GENERATION BASED ON PROFILED DATA OBJECTS

(71) Applicant: EMC Corporation, Hopkinton, MA (US)

(72) Inventors: David S. Reiner, Lexington, MA (US); Haji Aref, Foxborough, MA (US); Jeffrey D. Esposito, North Kingstown, RI (US); Yaron Dar, Sudbury, MA (US); Paul Krneta, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 621 days.

(21) Appl. No.: 14/169,811

(22) Filed: Jan. 31, 2014

(51) Int. Cl.
*G06F 17/30* (2006.01)
*G06F 3/06* (2006.01)

(52) U.S. Cl.
CPC ...... *G06F 17/30943* (2013.01); *G06F 3/0649* (2013.01); *G06F 17/30073* (2013.01); *G06F 17/30079* (2013.01); *G06F 17/30082* (2013.01); *G06F 17/30091* (2013.01); *G06F 17/30159* (2013.01); *G06F 17/30221* (2013.01)

(58) Field of Classification Search
CPC ......... G06F 17/30221; G06F 17/30079; G06F 17/30159; G06F 17/30091; G06F 17/30073; G06F 17/30082; G06F 3/0649
See application file for complete search history.

(56) References Cited

U.S. PATENT DOCUMENTS

| 6,601,233 | B1 * | 7/2003 | Underwood | 717/102 |
| 7,162,571 | B2 | 1/2007 | Kilian et al. | |
| 7,571,110 | B2 * | 8/2009 | Tarr | G06Q 10/0639 705/7.32 |

(Continued)

OTHER PUBLICATIONS

U.S. Appl. No. 13/538,219, filed Jun. 29, 2012 and entitled "Dynamic Information Assembly for Designated Purpose Based on Suitability Reasoning Over Metadata."

(Continued)

*Primary Examiner* — Rehana Perveen
*Assistant Examiner* — Huen Wong
(74) *Attorney, Agent, or Firm* — Ryan, Mason & Lewis, LLP

(57) ABSTRACT

An apparatus comprises a profiled data object service manager configured to generate at least one profiled data object service instantiation responsive to an invocation by a profiled data object service user. The profiled data object service manager comprises a profiled data object service reasoner configured to parse the user invocation, to map the parsed user invocation to one or more relevant profiled data objects using profiles of respective profiled data objects and relationships among multiple profiled data objects, to select one or more services to be instantiated based on the relevant profiled data objects, and to generate one or more instantiable service invocations for the one or more selected services. Additional functionality of the profiled data object service manager may comprise one or more of policy enforcement, service instantiation and service orchestration. The service manager is implemented using at least one processing device comprising a processor coupled to a memory.

20 Claims, 4 Drawing Sheets

(56) References Cited

U.S. PATENT DOCUMENTS

| | | | |
|---|---|---|---|
| 7,702,753 B2* | 4/2010 | Simongini | H04L 67/306 |
| | | | 455/418 |
| 8,233,604 B2* | 7/2012 | Lei | H04L 67/24 |
| | | | 379/201.02 |
| 8,381,213 B1 | 2/2013 | Naamad et al. | |
| 2003/0097574 A1* | 5/2003 | Upton | 713/183 |
| 2009/0254633 A1* | 10/2009 | Olive | G06Q 30/02 |
| | | | 709/218 |
| 2010/0015976 A1* | 1/2010 | Issa | G06F 17/30699 |
| | | | 455/435.1 |
| 2011/0014897 A1* | 1/2011 | Finucan | G06Q 10/10 |
| | | | 455/412.2 |
| 2011/0246907 A1* | 10/2011 | Wang | G06Q 30/0224 |
| | | | 715/751 |
| 2012/0192258 A1* | 7/2012 | Spencer | H04W 12/06 |
| | | | 726/7 |

OTHER PUBLICATIONS

U.S. Appl. No. 13/728,490, filed Dec. 27, 2012 and entitled "Data Classification System for Hybrid Clouds."

U.S. Appl. No. 13/249,422, filed Sep. 30, 2011 and entitled "Independent and Nested Hypervisors in a Storage System Environment."

U.S. Appl. No. 13/631,190, filed Sep. 28, 2012 and entitled "Application Program Interface."

U.S. Appl. No. 13/631,214, filed Sep. 28, 2012 and entitled "Automated Policy Based Scheduling and Placement of Storage Resources."

U.S. Appl. No. 13/336,613, filed Dec. 23, 2011 and entitled "Managing Data Sets by Reasoning over Captured Metadata."

\* cited by examiner

SERVICE GENERATION BASED ON PROFILED DATA OBJECTS

FIELD

The field relates generally to information processing systems, and more particularly to service generation in information processing systems.

BACKGROUND

A number of different techniques are known for generating services in information processing systems. For example, in some systems, storage arrays function as both data sources and data targets, and services in this context illustratively include moving, copying, synchronizing and deduplicating data. While useful, such services are very limited in scope and applicability. More particularly, such services are generally not able to discern or utilize data object content, classification, or structure, and therefore cannot perform logical integration of data objects for applications.

Other systems implement service functionality in a middleware or application tier, but service performance in such systems typically suffers from problems such as high latency of access to stored data and an excessive number of input-output (IO) operations. In addition, service integration and composition with other services is often hampered in systems of this type by the lack of a shared architecture, including profiles and directory and indexing capabilities. Moreover, service generation in the middleware or application tier context is often carried out using a proprietary intermediate language and suitable only for limited types of data structures, such as relational data.

SUMMARY

Illustrative embodiments of the present invention provide improved techniques for service generation utilizing what are referred to herein as "profiled data objects" or PDOs.

In one embodiment, an apparatus comprises a profiled data object service manager configured to generate at least one profiled data object service instantiation responsive to an invocation by a profiled data object service user. The profiled data object service manager comprises a profiled data object service reasoner configured to parse the user invocation, to map the parsed user invocation to one or more relevant profiled data objects using profiles of respective profiled data objects and relationships among multiple profiled data objects, to select one or more services to be instantiated based on the relevant profiled data objects, and to generate one or more instantiable service invocations for the one or more selected services.

Additional functionality of the profiled data object service manager in some embodiments comprises one or more of policy enforcement, service instantiation and service orchestration. For example, the profiled data object service reasoner may be further configured to enforce compliance of the one or more selected services with at least one of profiled data object access policies and service usage policies, in conjunction with generating the one or more instantiable service invocations.

The profiled data object service manager can further comprise distinct service instantiator and service orchestrator components, with the profiled data object service instantiator being configured to generate the at least one profiled data object service instantiation based on the instantiable service invocations generated by the profiled data object service reasoner, and the profiled data object service orchestrator being configured to provide run-time management and coordination of the at least one profiled data object service instantiation.

The profiled data object service manager is implemented using at least one processing device comprising a processor coupled to a memory. For example, the profiled data object service manager may be implemented using cloud infrastructure or another type of processing platform comprising multiple processing devices.

The illustrative embodiments provide a number of significant advantages relative to the conventional arrangements described above. For example, one or more embodiments can be configured to perform logical integration of data objects for applications, while avoiding problems such as high latency of access to stored data, excessive IO operations, lack of a shared architecture, and required use of proprietary intermediate languages and limited data structure types. These and other embodiments can advantageously facilitate generation of a wide array of services that are embedded in storage systems or otherwise reside "near storage" based on profiled data objects.

Embodiments of the invention include without limitation methods, apparatus, systems, and articles of manufacture comprising processor-readable storage media.

DETAILED DESCRIPTION

Illustrative embodiments of the present invention will be described herein with reference to exemplary information processing systems and associated profiled data object service managers each implemented using one or more processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination. The term "profiled data object service manager" is also intended to be broadly construed so as to encompass a wide variety of different arrangements for controlling the generation of services based on profiled data objects in an information processing system.

Figure 1:
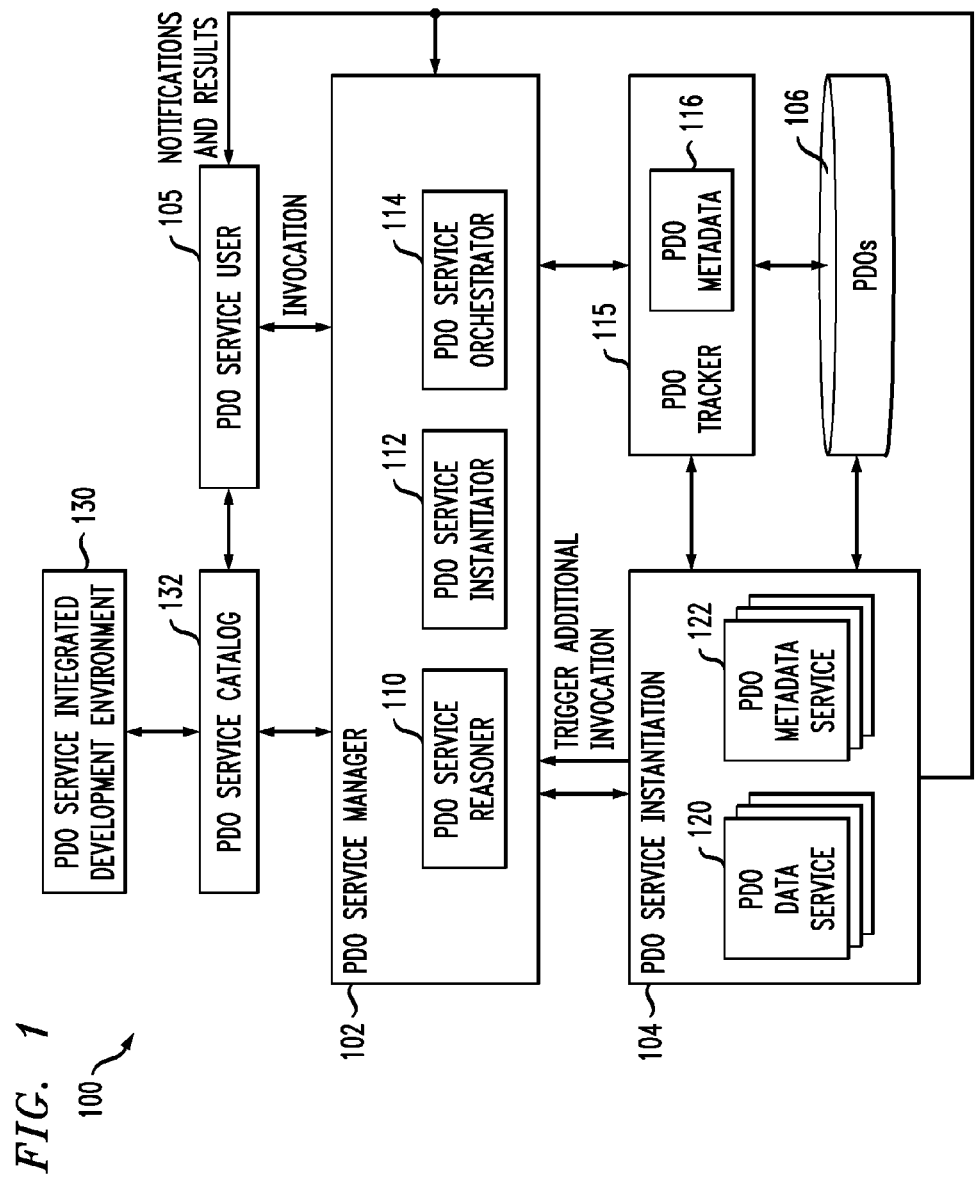
FIG. 1 is a block diagram of an information processing system comprising a profiled data object service manager configured to generate a profiled data object service instantiation in an illustrative embodiment of the invention.

FIG. 1 shows an information processing system 100 configured in accordance with an illustrative embodiment of the present invention. The information processing system 100 is configured to generate services based on profiled data objects or PDOs, and comprises a PDO service manager 102 configured to generate a PDO service instantiation 104 responsive to an invocation by a PDO service user 105. The PDO service instantiation 104 utilizes PDOs 106 which may comprise any combination of different PDO types, such as logical PDOs, physical PDOs and clustered PDOs. These and other aspects of exemplary PDOs utilizable in illustrative embodiments of the invention will be described in more detail below in conjunction with the PDO model of FIG. 2.

The PDO service manager 102 in the present embodiment comprises a PDO service reasoner 110, a PDO service instantiator 112 and a PDO service orchestrator 114. Numerous other arrangements of components may be used in other embodiments. For example, in other embodiments, functionality described below as being associated with one or more of the PDO service instantiator 112 and the PDO service orchestrator 114 may be implemented at least in part in the PDO service reasoner 110, or using additional or alternative components of the PDO service manager 102.

The PDO service reasoner 110 illustratively processes a given user invocation from the PDO service user 105 by parsing the user invocation, mapping the parsed user invocation to one or more relevant PDOs using profiles of respective PDOs and relationships among multiple PDOs or possibly other types of data objects, selecting one or more services to be instantiated based on the relevant PDOs, and generating one or more instantiable service invocations for the one or more selected services.

The user invocation may be configured at least in part in the form of a PDO language or PDOL. By way of example, PDOL in some embodiments utilizes a command structure identifying particular data object services to be applied to particular PDOs that match specified criteria, where the particular PDOs are selected based on one or more of their profiles and their relationships to other data objects. The latter data objects may comprise PDOs or ordinary non-profiled data objects.

As a more particular example, PDOL may be illustratively implemented in one or more embodiments as a specialized programming language designed for the manipulation of PDOs through services, within the limits of enforced PDO service policies. The language need not define relationships among PDOs. However, the language can be configured to utilize or refer to relationships. For example, the language could include a command such as "copy all versions of PDO X." Such a programming language may be viewed as an invocation manipulation language (IML), indirectly effecting transformation performed on the source data. Nonetheless, it should be appreciated that other PDOL implementations may utilize other language types, such as data definition language (DDL), data manipulation language (DML) or data control language (DCL), or combinations thereof.

A given PDOL implementation may incorporate aspects of both domain and tuple relational calculi, using similar operators, logical connectives and state qualifiers for predicate logic evaluation. Such PDOL elements can be utilized by the PDO service reasoner 110 in processing a given user invocation. PDOL is therefore illustratively configured with the expectation that the PDO service reasoner 110 will provide sufficient intelligent processing to convert higher-level services invoked by particular PDOL commands to appropriate lower-level services. PDOL may additionally or alternatively be configured to enable manipulation of PDOs as well as other functionality.

Although PDOL can be utilized in some embodiments, it is to be appreciated that a user invocation that triggers generation of a service based on PDOs in system 100 does not require any specific type of format.

The PDO service reasoner 110 may incorporate additional functionality for processing user invocations. For example, in some embodiments the PDO service reasoner 110 is further configured to enforce compliance of the one or more selected services with PDO access policies, service usage policies or other types of policies, prior to or otherwise in conjunction with generating the one or more instantiable service invocations.

The PDO service instantiator 112 is configured to generate the PDO service instantiation 104 based on the instantiable service invocations generated by the PDO service reasoner 110. As noted above, in other embodiments, the PDO service instantiator 112 may be implemented in or otherwise associated with the PDO service reasoner 110.

The PDO service orchestrator 114 is configured to provide run-time management and coordination of the PDO service instantiation 104 and possibly one or more additional service instantiations. Accordingly, in the present embodiment, the PDO service orchestrator 114 is assumed to perform downstream management and coordination of at least one active service instantiation.

Also included in the information processing system 100 is a PDO tracker 115 associated with the PDO service manager 102. The PDO tracker 115 is configured to provide PDO metadata 116 relating to one or more of the PDOs 106 to the PDO service instantiation 104. Although shown as separate from the PDO service manager 102 in the figure, in other embodiments the PDO tracker 115 may be incorporated in whole or in part within the PDO service manager 102. The PDO tracker 115 in the present embodiment is assumed to provide metadata regarding both physical PDOs and logical PDOs.

By way of example, the PDO service manager 102 via its PDO service reasoner 110 can utilize indexes, directories and other types of PDO metadata 116 provided by PDO tracker 115 to locate, extract, group and act upon PDOs in generating the PDO service instantiation 104. As a more particular example, a given one of the above-noted directories may comprise a plurality of nested key-value pairs, in which outer keys of the nested key-value pairs are used to match PDOs to multiple data objects, and inner keys of the nested key-value pairs are used to map to actual data object locations.

Other types of metadata associated with PDOs 106 and tracked by the PDO tracker 115 may comprise, for example, various types of PDO state, such as static, streaming, unknown or unassembled.

The term "metadata" as used herein is intended to be broadly construed, so as to encompass at least portions of PDO profiles and PDO relationships, as well as other types of metadata characterizing PDOs. Accordingly, particular types of metadata referred to herein may be part of a PDO profile or PDO relationship.

Additional details regarding exemplary types of metadata and associated reasoning functionality that may be implemented in the system 100 can be found in U.S. patent application Ser. No. 13/538,219, filed Jun. 29, 2012 and entitled "Dynamic Information Assembly for Designated Purpose based on Suitability Reasoning over Metadata," and U.S. patent application Ser. No. 13/336,613, filed Dec. 23, 2011 and entitled "Managing Data Sets by Reasoning over Captured Metadata," both of which are commonly assigned herewith and incorporated by reference herein.

The PDO service instantiation 104 in the present embodiment illustratively comprises one or more PDO data services 120 and one or more PDO metadata services 122 based on PDO metadata 116 provided by the PDO tracker 115. Other arrangements of PDO data services and PDO metadata services may be used in a given PDO instantiation generated by the PDO service manager 102. A given one of the PDO data services 120 generally utilizes one or more of the PDOs 106 and a given one of the PDO metadata services 122 generally utilizes and possibly updates at least a portion of the PDO metadata 116 relating to one or more of the PDOs 106 as provided by the PDO tracker 115.

The one or more PDO data services 120 and one or more PDO metadata services 122 are assumed to be instantiated under the control of the PDO service instantiator 112. For example, the PDO service instantiator 112 can enact core PDO data services, possibly focused on granular storage placement in terms of application use or business data context, as well as associated PDO metadata services. However, one or more other PDO data services or PDO metadata services in system 100 need not be directly instantiated under the control of the PDO service instantiator 112 or the PDO service manager 102. For example, certain types of long-running services may be started independently of the PDO service instantiation 104 and PDO service manager 102. A more particular example of such a service is an Extract, Transform and Load (ETL) process, which may be configured to update PDO metadata 116 of the PDO tracker 115. Such a process is illustratively data-driven and originates outside of the PDO service manager 102.

As illustrated in the figure, it is possible for the PDO service instantiation 104 to itself trigger at least one additional invocation of the PDO service manager 102. Such additional invocations can lead to further refinement of the PDO service instantiation 104 or generation of one or more additional PDO service instantiations.

The information processing system 100 further comprises a PDO service integrated development environment (IDE) 130. The PDO service IDE 130 is configured for development of services and associated policies for utilization by the PDO service manager 102 and the PDO service user 105. The PDO service IDE 130 can also be used to develop services that are compositions of other services. In this embodiment, the services developed using the PDO service IDE 130 are part of a PDO service catalog 132 that is accessible to both the PDO service manager 102 and the PDO service user 105. Thus, the user invocation processed by the PDO service manager 102 can be based at least in part on services from the PDO service catalog 132. Also, the PDO service manager 102 can utilize the service catalog in processing user invocations as well as any additional invocations triggered by the PDO service instantiation 104.

Techniques that may be utilized in implementing a service catalog across heterogeneous objects and underlying services are disclosed in U.S. patent application Ser. No. 13/631,190, filed Sep. 28, 2012 and entitled "Application Program Interface," and U.S. patent application Ser. No. 13/631,214, filed Sep. 28, 2012 and entitled "Automated Policy Based Scheduling and Placement of Storage Resources," both of which are commonly assigned herewith and incorporated by reference herein.

The service catalog 132 in the present embodiment is assumed to include a set of services that can be embedded in a storage system or otherwise reside "near storage" so as to be carried out closer to the underlying data than conventional limited data services. Such a service catalog when leveraged by the PDO service manager 102 to instantiate PDO-based services provides significant advantages relative to conventional arrangements. For example, it facilitates accommodation of the distributed and heterogeneous aspects of cloud infrastructure, supports analytic applications that access and monetize big data, and enables data-centric applications to cope with the dynamism and scope of combined platforms. In addition, it reduces the number of IO operations required by applications, and provides faster analytics.

The one or more services selected by the PDO service reasoner 110 in generating the PDO service instantiation 104 are illustratively selected from available services supported by the PDO service manager 102, at least a portion of which may be part of the PDO service catalog 132. These available services may comprise, for example, assert structure, discover structure, place, scan, search by criteria, search similar, aggregate, join, federate query, index, subset, analyze, transform, anonymize, compress, classify, split, partition, assemble, replicate, selective copy, selective move, assert constraint, assert policy, filter, synchronize, derive metadata and update metadata. Certain ones of these exemplary services will be described in greater detail below in the context of the flow diagram of FIG. 3.

The PDO service instantiation 104 in some embodiments comprises a layered and composed arrangement of selected ones of the above-noted available services as determined by the PDO service reasoner 110 in processing the user invocation.

Additionally or alternatively, the PDO service manager 102 can generate the PDO service instantiation 104 as a logical integration of multiple data objects for one or more applications.

The PDO service instantiation 104 provides notifications and results relating to the corresponding service or services back to at least one of the PDO service manager 102 and the PDO service user 105.

At least a portion of the available services may be embedded in a storage system that stores at least a portion of the relevant PDOs to be operated on by those services. Such embedded implementation of services is an example of what is more generally referred to herein as service generation utilizing services "near storage" based on PDOs. Illustrative embodiments of the invention facilitate such service generation while avoiding problems of conventional practice such as high latency of access to stored data, excessive IO operations, lack of a shared architecture, and required use of proprietary intermediate languages and limited data structure types.

In some embodiments, embedded services or other implementations of services "near storage" may utilize techniques such as those disclosed in U.S. patent application Ser. No. 13/249,422, filed on Sep. 30, 2011 and entitled "Independent and Nested Hypervisors in a Storage System Environment," which is commonly assigned herewith and incorporated by reference herein. Numerous other techniques may be used to embed services in storage systems or otherwise implement services "near storage."

At least portions of a storage system utilized to store physical data objects in information processing system 100 can be implemented using one or more storage arrays. Such storage arrays may comprise, for example, storage products such as VNX® and Symmetrix VMAX®, both commercially available from EMC Corporation of Hopkinton, Mass. A variety of other storage products may be utilized to implement storage arrays or other types of storage systems in the system 100. The term "storage system" as used herein is therefore intended to be broadly construed.

As a more particular example of an arrangement in which services are embedded in a storage system or otherwise implemented "near storage" in the manner described above, a storage system comprises a database server that communicates via multiple database IO channels with underlying database data on storage arrays. The storage system is further configured to incorporate a transformation engine that communicates with the database server. The database server exports retrieved data objects from the storage arrays and provides them to the transformation engine, and reloads transformed data objects from the transformation engine for storage back into the storage arrays. The transformation engine comprises a multi-channel system arranged in parallel with the database server, and utilizes its own storage and computing resources in implementing transformations of data objects in accordance with embedded services. Again, this is only an example, and numerous other types of service embedding or service implementation "near storage" may be used.

The PDO service manager 102 via its PDO service reasoner 110 in some embodiments implements an adjustment mechanism that alters services and policies in the PDO service catalog 132 based on trended results by PDO metadata or other factors.

The PDO service manager 102 and possibly other components of system 100 in the present embodiment are assumed to be implemented using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

The one or more processing devices implementing PDO service manager 102 and possibly other components of system 100 may each further include a network interface that allows such components to communicate with one another over one or more networks. For example, a given such network interface illustratively comprises network interface circuitry that allows the PDO service manager 102 to communicate over a network with other components of the system 100 such as PDO service instantiation 104, PDO service user 105, PDO tracker 115 and PDO service catalog 132. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a portion of the PDO service manager 102 and possibly other system components may comprise software that is stored in a memory and executed by a processor of at least one processing device.

Processing devices comprising processors, memories and network interfaces as described above may be part of a processing platform comprising physical and virtual resources in any combination. Additional examples of such processing platforms that may be used to implement at least portions of the system 100 will be described in more detail below in conjunction with FIGS. 4 and 5.

It should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations.

Figure 2:
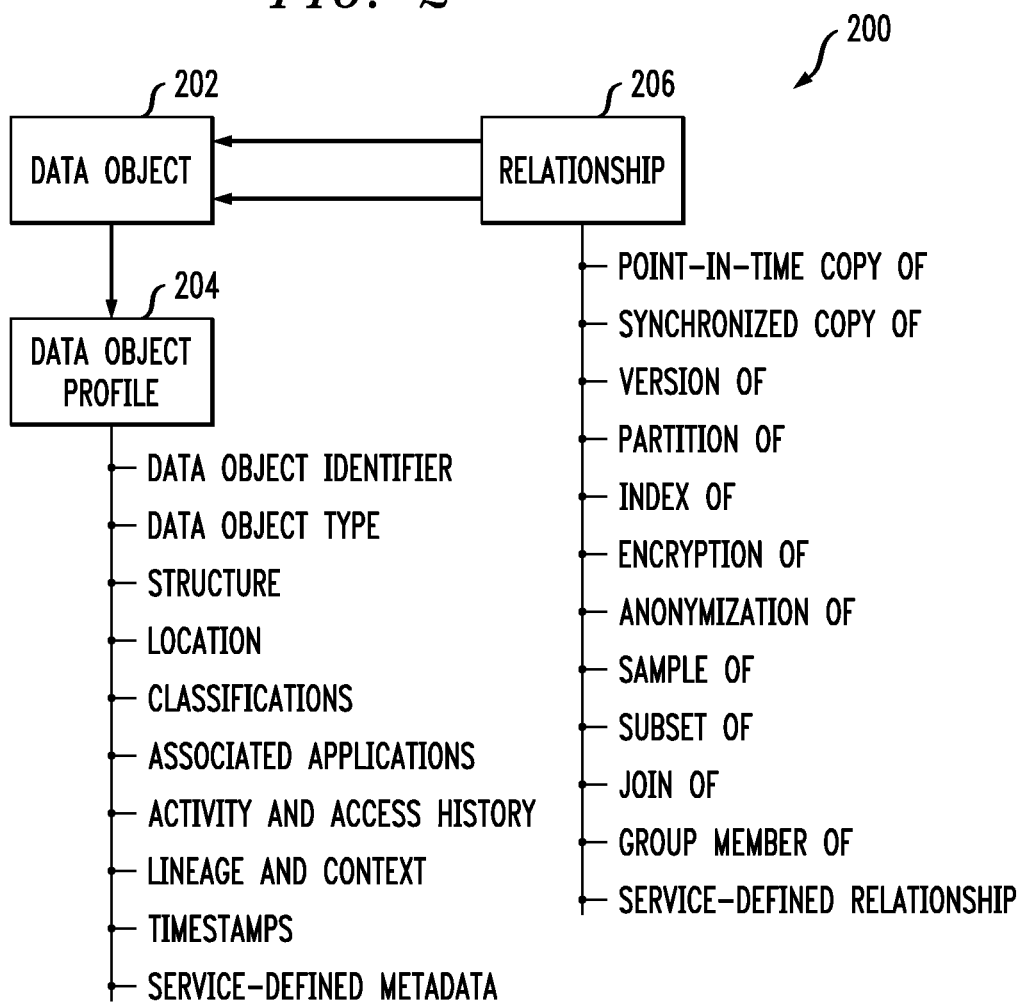
FIG. 2 shows an exemplary profiled data object model including possible elements of a data object profile and possible relationships among a data object and one or more other data objects.

Referring now to FIG. 2, an exemplary PDO model 200 is shown. In this model, a data object 202 has a data object profile 204. A data object having such a profile is generally referred to herein as a PDO.

The data object 202 may have at least one relationship 206 with one or more other data objects, which as indicated previously may be PDOs or non-profiled data objects. The profile 204 and relationship 206 of a PDO are utilized by the PDO service reasoner 110 in generating services based on the PDO and other PDOs or data objects. It should be noted that the data object profile 204 for a given PDO may be complete, partially complete, empty or unknown at various points in time. Also, a particular relationship 206 for a given PDO may be present or absent at various points in time. Other types of state information may be used to characterize profiles and relationships in other embodiments.

A number of examples of possible elements of data object profile 204 are shown in the figure. These include identifier, type (e.g., block, file, object, LUN, tablespace, application object type, etc.), structure (e.g., sets of tabular rows, hybrid compressed columns, sets of key-value pairs, hierarchical objects, text, XML, audio, video, authorizations, queries, transactions, unknown, etc.), location (e.g., logical or physical), classification (e.g., according to multiple classification schemes, such as content, security level, recent access heat, historical access heat, etc.), associated application (e.g., owner, level, document, application module, etc.), activity and access history (e.g., augmented by data object classifications related to inferred or observed activities involving the data object), lineage and context (e.g., source and target), timestamp (e.g., representing creation, last update, end of validity, etc.) and service-defined metadata. Combinations of multiple instances of these and other profile elements may be used in configuring a given PDO.

Certain profile elements in the PDO model may themselves be considered objects, having their own attributes, including some that are specialized. For example, data object location, either logical or physical, may itself comprise an object, configured to describe an enterprise environment having multiple distinct processing tiers. In this case, location attributes may be used to determine object placement affinities, policies, and decisions, such as where in a hybrid cloud certain types of objects should be placed. Additional details regarding arrangements of the latter type can be found in U.S. patent application Ser. No. 13/728,490, filed Dec. 27, 2012 and entitled "Data Classification System for Hybrid Clouds," which is commonly assigned herewith and incorporated by reference herein.

A number of examples of possible relationships 206 among a data object and one or more other data objects are also shown in the figure. These include point-in-time copy (e.g., PDO A is a point-in-time copy of PDO B), synchronized copy, version, partition, index or other direct access structure, encryption, anonymization, sample, subset, join (e.g., inner join, outer join, etc.), group member (e.g., classification based, related to group consistency, related to business definitions, etc.) and service-defined relationship (e.g., reduction from MapReduce). Again, combinations of multiple instances of these and other relationships may be used in configuring a given PDO.

The particular PDO model 200 illustrated in FIG. 2 is exemplary only, and PDOs may be configured using other types of models in other embodiments.

As indicated previously, a given PDO may comprise multiple distinct PDO types. For example, a logical PDO may be formed as a combination of multiple underlying physical PDOs each corresponding to an actual stored data object. These and other arrangements of multiple PDOs may be viewed as examples of what are more generally referred to herein as clustered PDOs, and such clustered PDOs may comprise logical PDOs, physical PDOs and other types of PDOs in any combination.

Accordingly, PDOs may be abstractions, such as groupings or sub-groupings, above the underpinnings of files, blocks or other data objects, or directly implemented in object-based storage. PDOs may be grouped logically based on any of their metadata attributes to be acted upon by data object services.

Embodiments can therefore be configured to combine related data objects (e.g., keep object versions together, or members of a group together). As indicated above, multi-level clustering of PDOs is possible, with such arrangements utilizing profile metadata to enable static, dynamic and rule-based clustering. Such metadata illustratively includes the previously-mentioned indexes and directories used to locate, extract, group, and act upon objects.

The physical storage of data objects characterized by the PDO model 200 may utilize one or more object stores implemented in system 100. Such object stores may be implemented using techniques such as those disclosed in U.S. Pat. No. 7,162,571, issued Jan. 9, 2007 and entitled "Methods and Apparatus for Parsing a Content Address to Facilitate Selection of a Physical Storage Location in a Data Storage System," which is commonly assigned herewith and incorporated by reference herein.

It should be understood that the particular PDO model 200 of FIG. 2 is exemplary only, and other types of PDOs configured in accordance with other models may additionally or alternatively be used. For example, although shown as separate from the profile 204 in the model 200, relationship 206 in other models may be considered part of the profile 204. Thus, different embodiments may store information characterizing inter-object relationships within the profiles rather than external to the profiles.

The operation of the information processing system 100 will now be described in greater detail with reference to the flow diagram of FIG. 3, which illustrates an exemplary service generation process in one embodiment. The process as shown includes steps 300 through 310. The process is assumed to be performed by the PDO service manager 102, and more particularly by the PDO service reasoner 110 of PDO service manager 102, although in other embodiments at least portions of one or more of the process steps 300 through 310 may be performed by other system components. Also, the PDO service reasoner 110 and any such other system components can include additional or alternative functionality that is not reflected in the exemplary process of FIG. 3. Accordingly, the PDO service reasoner 110 should not be viewed as being limited in any way to the particular process steps described below.

In step 300, the PDO service reasoner 110 parses a service invocation from the PDO service user 105. The service invocation from the PDO service user 105 is an example of what is more generally referred to herein as a "user invocation." As indicated above, such invocations may be formatted in the present embodiment in accordance with a PDO language or PDOL, although a wide variety of other formats may be used.

In step 302, the PDO service reasoner 110 maps the parsed service invocation to one or more relevant PDOs through use of PDO profiles and relationships among PDOs. As mentioned previously, the relationships utilized in this step may additionally or alternatively include relationships among a given PDO and one or more non-profiled data objects.

In step 304, the PDO service reasoner 110 selects services to be instantiated, including service locations. For example, the PDO service reasoner may select a particular processing tier or location tier for use in conjunction with particular services to be instantiated. At least a subset of such tiers may comprise respective embedded locations selected to ensure that particular services are instantiated sufficiently "near storage" for the corresponding PDOs. Services to be instantiated may use or produce data or metadata or both.

In steps 306 and 308, the PDO service reasoner 110 enforces compliance with PDO access policies and service usage policies, respectively. Such policies may be determined at least in part by reference to the PDO service catalog 132.

It should be noted that the PDO access policies and service usage policies may additionally or alternatively restrict the mapping to relevant PDOs in step 302 and the selection of services in step 304. Accordingly, one or both of steps 306 and 308 may be performed at least in part prior to or in conjunction with the corresponding mapping and service selection steps 302 and 304. For example, steps 306 and 308 may be at least partially incorporated into respective steps 302 and 304 in other embodiments.

In step 310, the PDO service reasoner 110 generates instantiable service invocations that are utilized by the PDO service instantiator 112 to provide PDO service instantiation 104.

Figure 3:
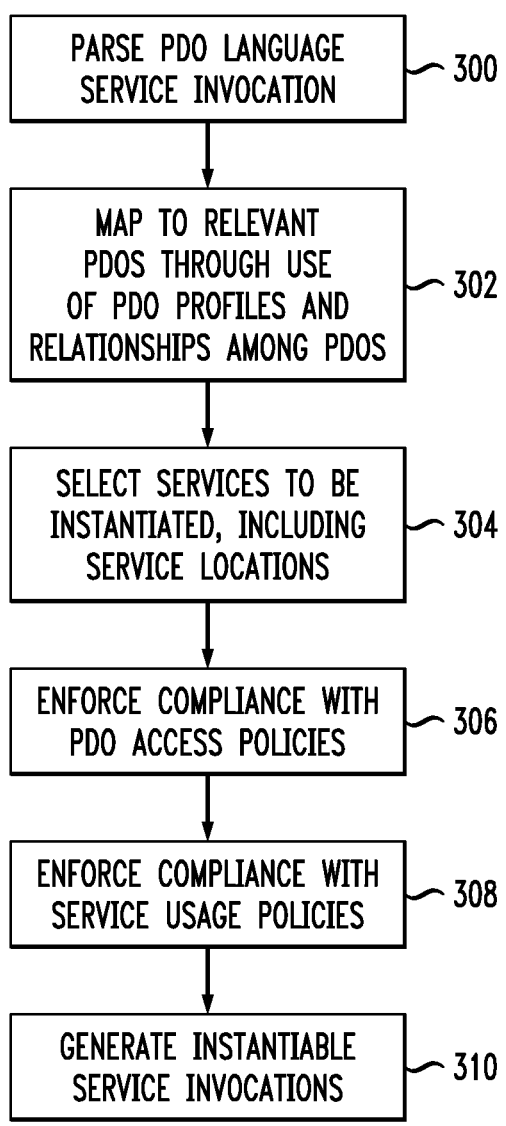
FIG. 3 is a flow diagram of an exemplary process for service generation based on profiled data objects in the information processing system of FIG. 1.

Examples of services that may be selected and invoked in respective steps 304 and 310 of the FIG. 3 process were given previously. These services may be more particularly configured in the following manner:

Assert_Object_Structure and Discover_Object_Structure to deal with internal object structures and types.

Assert_Attribute and Assert_Usage, as hints to aid placement, access, movement and protection of objects. The hints may utilize techniques disclosed in U.S. Pat. No. 8,381,213, issued Feb. 19, 2013 and entitled "Method for Dynamic Management of System Resources through Application Hints," which is commonly assigned herewith and incorporated by reference herein.

Place_Object, which may be based on profile similarities, data object relationships, PDO policies or other considerations.

Scan, Search_By_Criteria, Search_Similar, Aggregate and Join, in support of database processing or application logic.

Federate Query, to formulate and orchestrate subqueries that cope with environments where one or more data sources are each heterogeneous and distributed.

Index, to build or update an index to aid search or stand as proxy for the underlying object in query processing where possible.

Subset, Analyze, Transform, Anonymize, Compress, Classify, Split, Partition, Assemble, Replicate, Selective Copy and Selective Move, as additional services operating on data objects.

Assert_Constraint and Assert_Policy, to define allowed or disallowed PDO state or behavior of services on PDOs.

These services may be selectable at least in part from the PDO service catalog 132 or from other sources of available services accessible to the PDO service manager 102. Again, these particular services are exemplary only, and additional or alternative services can be used, in any combination. As mentioned previously, data object services can be layered and composed to enable the definition and construction of a wide variety of different higher-level data object services.

It is assumed in the foregoing description of the FIG. 3 process that the processed invocation is a user invocation received from the PDO service user 105. However, an additional invocation triggered by an existing PDO service instantiation can be processed in a similar manner. Invocations of the latter type are considered to fall within the broad scope of the term "user invocation" as utilized herein. Accordingly, the term "user" is also intended to be broadly construed, and may comprise, for example, a human user, a terminal device, a software or hardware entity, or various combinations thereof.

The particular processing operations and other system functionality described in conjunction with the flow diagram of FIG. 3 are presented by way of illustrative example only, and should not be construed as limiting the scope of the invention in any way. Alternative embodiments can use other types of processing operations for implementing service generation based on PDOs in system 100. For example, the ordering of the process steps may be varied in other embodiments, or certain steps may be performed concurrently with one another rather than serially.

It is to be appreciated that functionality such as that described in conjunction with the flow diagram of FIG. 3 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

The illustrative embodiments described above advantageously provide a unifying architecture for data object description and discovery, including directories and indexes into PDOs, which enables new data object services to be implemented effectively within or near a storage array or other type of storage system.

Examples of data object services that may be implemented in illustrative embodiments include the following:

1. Copy a set of specific transactional data for testing or upgrades.

2. Determine which data and what types of data reside on which tiers for performance improvement and governance.

3. Move transactional and master data changes from one system to another efficiently, while reducing copying and cloning by only synchronizing needed data.

4. Pull together disparate data from multiple enterprise systems and platforms in support of strategic "data monetization" initiatives.

5. Maintain group consistency and data synchronization at the object level across multiple, heterogeneous systems.

6. Improve data classification and discovery across multiple platforms to help build 360° data views and to support data scientists building predictive models.

7. Automate data discovery and collection to speed up system processing and data requests.

8. Speed queries against vast amounts of enterprise and mobile data in support of location-based marketing and other location-based services.

9. Read data packets and identify behavior patterns at the storage level to fix application data errors and application queue corruption much more quickly.

One or more of these data object services may be implemented in illustrative embodiments as compositions of multiple data services. Again, the foregoing data object services are merely examples, and numerous other types of services can be generated based on PDOs in illustrative embodiments of the invention.

Other embodiments can utilize PDOs in implementing additional or alternative functionality including, for example, application data object recognition and smart management; dynamic placement of data objects based on profiles and relationships; data object activity tracking, provisioning and management; workload analysis and service level objective achievement; definition and manipulation of PDOs through a context-aware syntax; data object cross-correlation and analysis; metadata-driven accelerated data movement and loading; automated transformations involving compression, anonymization or other types of transforms; and numerous other types of PDO-based functionality.

The illustrative embodiments provide a number of significant advantages relative to conventional practice. For example, as indicated previously, one or more embodiments can be configured to perform logical integration of data objects for applications, while avoiding problems such as high latency of access to stored data, excessive IO operations, lack of a shared architecture, and required use of proprietary intermediate languages and limited data structure types. These and other embodiments can advantageously facilitate generation of a wide array of services "near storage" based on profiled data objects.

Moreover, data service quality is substantially improved through the use of PDOs that provide system awareness of data object content and associated data object metadata.

Embodiments of the invention therefore improve on conventional approaches by providing an open system and unified architectural approach, allowing layers of higher level data services to be constructed within a uniform architectural framework, against heterogeneous data object structures.

For example, system performance is enhanced in some embodiments by moving certain aspects of database and application processing "near storage" and thus closer to the data, with the scalability of object-level manipulation being enhanced by the scalability of the underlying storage system capabilities.

Furthermore, embodiments of the invention increase business agility by facilitating the generation of services using heterogeneous data objects, in an extensible fashion that permits highly efficient development of next generation data services utilizing underlying storage systems.

It is to be appreciated that the foregoing advantages are illustrative of advantages provided in certain embodiments, and need not be present in other embodiments.

It was noted above that portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 4:
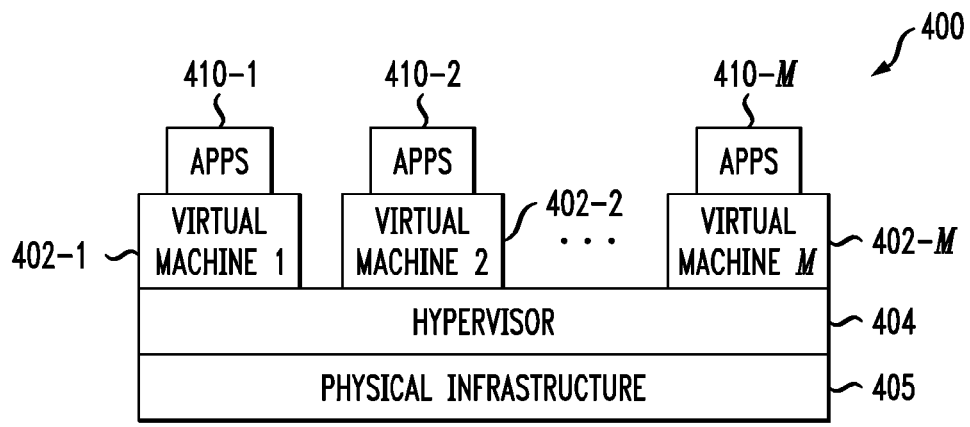
FIGS. 4 and 5 show examples of processing platforms that may be utilized to implement at least a portion of the information processing system of FIG. 1.
Figure 5:
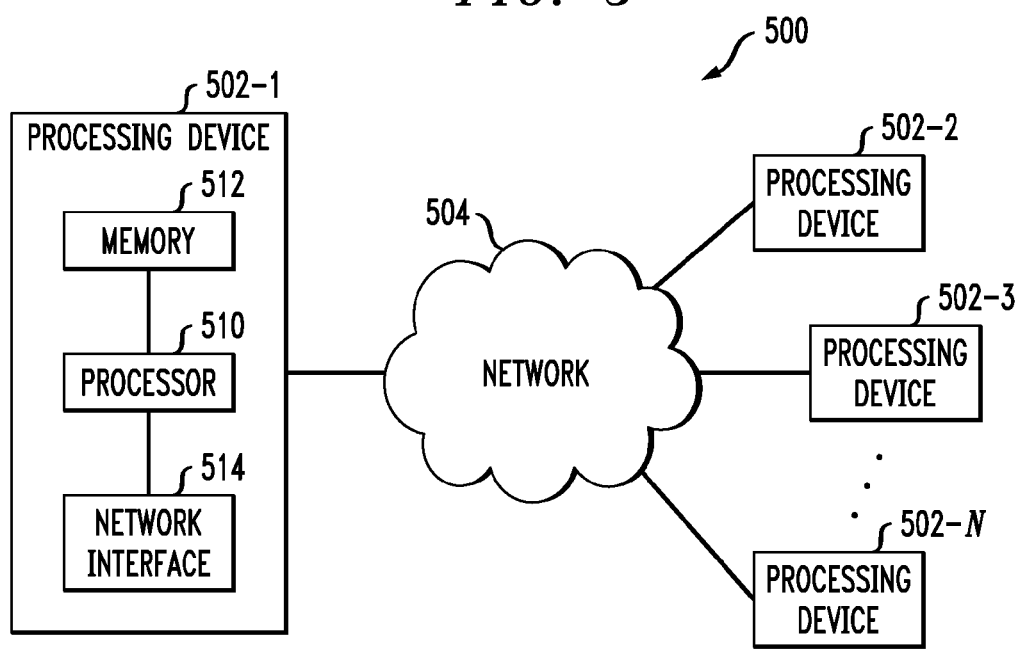

As shown in FIG. 4, portions of the information processing system 100 may comprise cloud infrastructure 400. The cloud infrastructure 400 comprises virtual machines (VMs) 402-1, 402-2, . . . 402-M implemented using a hypervisor 404. The hypervisor 404 runs on physical infrastructure 405. The cloud infrastructure 400 further comprises sets of applications 410-1, 410-2, . . . 410-M running on respective ones of the virtual machines 402-1, 402-2, . . . 402-M under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of a PDO service manager, PDO service reasoner or other component of the system 100.

An example of a commercially available hypervisor platform that may be used to implement hypervisor 404 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-N, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an ASIC, an FPGA, or other type of processing circuitry, as well as portions or combinations of such circuitry elements.

The memory 512 may comprise RAM, ROM or other types of memory, in any combination. As mentioned previously, the memory 512 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, service managers, service reasoners and other components. In addition, the particular PDO formats including profiles, relationships, invocations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
   a profiled data object service manager configured to generate at least one profiled data object service instantiation responsive to an invocation by a profiled data object service user;
   the profiled data object service manager comprising a profiled data object service reasoner;
   wherein the profiled data object service reasoner is configured to parse the user invocation, to map the parsed user invocation to one or more relevant profiled data objects selected from a plurality of profiled data objects using profiles of respective profiled data objects and relationships among multiple profiled data objects, to select one or more services to be instantiated based on the relevant profiled data objects, and to generate one or more instantiable service invocations for said one or more selected services;

wherein a given one of the profiled data objects is associated with first state information and second state information, the first state information characterizing a completeness of a profile of the given profiled data object, the second state information characterizing presence or absence of a relationship of the given profiled data object with one or more other ones of the profiled data objects;

wherein the profiled data object service reasoner utilizes the first and second state information associated with the given profiled data object in mapping the parsed user invocation to the one or more relevant profiled data objects;

wherein the relevant profiled data objects for a given one of the one or more services to be instantiated comprise a given subset of the plurality of profiled data objects that are utilized by the given service;

wherein different subsets of the plurality of profiled data objects are stored on different ones of a plurality of different storage systems, with one or more of the plurality of different storage systems storing at least a portion of the given subset of the plurality of profiled data objects and one or more other ones of the plurality of different storage systems not storing at least a portion of the given subset of the plurality of profiled data objects;

wherein the profiled data object service reasoner is further configured to select a service location for the given service, the selected service location comprising a given one of the plurality of different storage systems that stores at least a portion of the given subset of the plurality of profiled data objects; and wherein the profiled data object service manager is implemented using at least one processing device comprising a processor coupled to a memory.

2. The apparatus of claim 1 wherein the profiled data object service reasoner is further configured to enforce compliance of said one or more selected services with at least one of profiled data object access policies and service usage policies, in conjunction with generating said one or more instantiable service invocations.

3. The apparatus of claim 1 wherein the profile of a given one of the profiled data objects comprises at least one of each of one or more of identifier, type, structure, location, classification, associated application, activity history, access history, lineage, context, timestamp and service-defined metadata.

4. The apparatus of claim 1 wherein the relationships among multiple profiled data objects comprise at least one of each of one or more of point-in-time copy, synchronized copy, version, partition, index, encryption, anonymization, sample, subset, join, group member and service-defined relationship.

5. The apparatus of claim 1 wherein the profiled data object service manager further comprises at least one of:
a profiled data object service instantiator implemented in or otherwise associated with the profiled data object service reasoner and configured to generate said at least one profiled data object service instantiation based on said instantiable service invocations generated by the profiled data object service reasoner; and
a profiled data object service orchestrator configured to provide run-time management and coordination of said at least one profiled data object service instantiation.

6. The apparatus of claim 1 further comprising a profiled data object tracker associated with the profiled data object service manager and configured to provide metadata regarding profiled data objects to said at least one profiled data object service instantiation.

7. The apparatus of claim 1 wherein the profiled data objects satisfy one or more of the following:
at least one of the profiled data objects comprises a clustered profiled data object comprising a plurality of profiled data objects; and
at least one of the profiled data objects comprises a logical profiled data object having one or more underlying physical profiled data objects.

8. The apparatus of claim 1 wherein said at least one profiled data object service instantiation satisfies one or more of the following:
said at least one profiled data object service instantiation comprises at least one of a data service and a metadata service; and
said at least one profiled data object service instantiation is configured to trigger at least one additional invocation of the profiled data object service manager.

9. The apparatus of claim 1 further comprising a profiled data object service integrated development environment configured for development of a plurality of services and associated policies for utilization by at least one of the profiled data object service manager and the profiled data object service user.

10. The apparatus of claim 1 wherein said one or more selected services are selected by the profiled data object service reasoner from a plurality of available services including two or more of assert structure, discover structure, place, scan, search by criteria, search similar, aggregate, join, federate query, index, subset, analyze, transform, anonymize, compress, classify, split, partition, assemble, replicate, selective copy, selective move, assert constraint, assert policy, filter, synchronize, derive metadata and update metadata.

11. The apparatus of claim 10 wherein said at least one profiled data object service instantiation comprises a layered and composed arrangement of selected ones of the plurality of available services as determined by the profiled data object service reasoner.

12. The apparatus of claim 10 wherein at least a portion of the plurality of available services are embedded in the one or more storage systems that store at least a portion of the relevant profiled data objects to be operated on by those services.

13. The apparatus of claim 1 wherein the user invocation is configured in accordance with a profiled data object language that utilizes a command structure identifying particular data object services to be applied to particular profiled data objects that match specified criteria, where said particular profiled data objects are selected based on one or more of their profiles and their relationships to other data objects.

14. The apparatus of claim 1 wherein the profiled data object service manager utilizes at least one of indexes and directories to locate, extract, group and act upon profiled data objects in generating said at least one profiled data object service instantiation.

15. The apparatus of claim 14 wherein a given one of said directories comprises a plurality of nested key-value pairs, in which outer keys of the nested key-value pairs are used to match data object profiles to multiple data objects, and inner keys of the nested key-value pairs are used to map to actual data object locations.

16. An information processing system comprising the apparatus of claim 1.

17. A method comprising:
receiving an invocation from a profiled data object service user; and
generating at least one profiled data object service instantiation responsive to the user invocation;
wherein generating at least one profiled data object service instantiation comprises parsing the user invocation, mapping the parsed user invocation to one or more relevant profiled data objects selected from a plurality of profiled data objects using profiles of profiled data objects and relationships among multiple profiled data objects, selecting one or more services to be instantiated based on the relevant profiled data objects, and generating one or more instantiable service invocations for said one or more services;
wherein a given one of the profiled data objects is associated with first state information and second state information, the first state information characterizing a completeness of a profile of the given profiled data object, the second state information characterizing presence or absence of a relationship of the given profiled data object with one or more other ones of the profiled data objects;
wherein the first and second state information associated with the given profiled data object are utilized in mapping the parsed user invocation to the one or more relevant profiled data objects;
wherein the relevant profiled data objects for a given one of the one or more services to be instantiated comprise a given subset of the plurality of profiled data objects that are utilized by the given service;
wherein different subsets of the plurality of profiled data objects are stored on different ones of a plurality of different storage systems, with one or more of the plurality of different storage systems storing at least a portion of the given subset of the plurality of profiled data objects and one or more other ones of the plurality of different storage systems not storing at least a portion of the given subset of the plurality of profiled data objects; and
selecting a service location for the given service, the selected service location comprising a given one of the plurality of different storage systems that stores at least a portion of the given subset of the plurality of profiled data objects;
wherein the receiving and generating are performed by at least one processing device comprising a processor coupled to a memory.

18. The method of claim 17 wherein generating at least one profiled data object service instantiation comprises enforcing compliance of said one or more selected services with at least one of profiled data object access policies and service usage policies, in conjunction with generating said one or more instantiable service invocations.

19. The method of claim 17 wherein generating at least one profiled data object service instantiation comprises generating the profiled data object service instantiation as a layered and composed arrangement of selected ones of a plurality of available services, at least a portion of which are embedded in a storage system that stores corresponding profiled data objects to be operated on by those services.

20. An article of manufacture comprising a processor-readable storage medium having encoded therein executable code of one or more software programs, wherein the one or more software programs when executed by a processor of at least one processing device cause said at least one processing device:
to receive an invocation from a profiled data object service user; and
to generate at least one profiled data object service instantiation responsive to the user invocation;
wherein generating at least one profiled data object service instantiation comprises parsing the user invocation, mapping the parsed user invocation to one or more relevant profiled data objects selected from a plurality of profiled data objects using profiles of profiled data objects and relationships among multiple profiled data objects, selecting one or more services to be instantiated based on the relevant profiled data objects, and generating one or more instantiable service invocations for said one or more services;
wherein a given one of the profiled data objects is associated with first state information and second state information, the first state information characterizing a completeness of a profile of the given profiled data object, the second state information characterizing presence or absence of a relationship of the given profiled data object with one or more other ones of the profiled data objects;
wherein the first and second state information associated with the given profiled data object are utilized in mapping the parsed user invocation to the one or more relevant profiled data objects;
wherein the relevant profiled data objects for a given one of the one or more services to be instantiated comprise a given subset of the plurality of profiled data objects that are utilized by the given service;
wherein different subsets of the plurality of profiled data objects are stored on different ones of a plurality of different storage systems, with one or more of the plurality of different storage systems storing at least a portion of the given subset of the plurality of profiled data objects and one or more other ones of the plurality of different storage systems not storing at least a portion of the given subset of the plurality of profiled data objects; and
wherein the one or more software programs when executed by the processor further cause said at least one processing device to select a service location for the given service, the selected service location comprising a given one of the plurality of different storage systems that stores at least a portion of the given subset of the plurality of profiled data objects.

* * * * *